US010404703B1

(12) United States Patent
Peterson

(10) Patent No.: US 10,404,703 B1
(45) Date of Patent: Sep. 3, 2019

(54) SYSTEMS AND METHODS FOR THIRD-PARTY INTEROPERABILITY IN SECURE NETWORK TRANSACTIONS USING TOKENIZED DATA

(71) Applicant: Vantiv, LLC, Symmes Township, OH (US)

(72) Inventor: Brant Peterson, Denver, CO (US)

(73) Assignee: Worldpay, LLC, Symmes Township, OH (US)

( * ) Notice: Subject to any disclaimer, the term of this patent is extended or adjusted under 35 U.S.C. 154(b) by 321 days.

(21) Appl. No.: 15/368,093

(22) Filed: Dec. 2, 2016

(51) Int. Cl.
*G06Q 10/00* (2012.01)
*H04L 29/06* (2006.01)
*G06Q 50/26* (2012.01)

(52) U.S. Cl.
CPC .............. *H04L 63/10* (2013.01); *H04L 63/08* (2013.01); *G06F 2221/0711* (2013.01); *G06Q 50/26* (2013.01)

(58) Field of Classification Search
CPC ........ G06F 21/34; G06Q 20/10; G06Q 20/14; H04L 9/3263; H04L 9/3215; H04L 63/0807; H04L 63/0823
USPC ..... 235/375–380, 487, 492; 380/30; 705/18; 706/12, 15, 45; 709/220–223; 726/20, 726/21
See application file for complete search history.

(56) References Cited

U.S. PATENT DOCUMENTS

| | | | | |
|---|---|---|---|---|
| 8,135,648 | B2 * | 3/2012 | Oram ................. | G06Q 20/3674 463/17 |
| 8,424,750 | B2 * | 4/2013 | Grovit ................... | G06Q 20/02 235/375 |
| 8,473,334 | B2 * | 6/2013 | Gibbs ................... | G06Q 30/02 705/14.37 |
| 8,752,146 | B1 * | 6/2014 | van Dijk ............. | H04L 63/0861 340/5.52 |
| 8,787,570 | B2 * | 7/2014 | Braness ............. | H04N 21/2393 380/200 |
| 8,918,908 | B2 * | 12/2014 | Ziskind ................... | G06F 21/10 726/30 |
| 8,930,702 | B2 * | 1/2015 | Marien ................... | G06F 21/34 713/172 |
| 9,098,691 | B2 * | 8/2015 | Hoornaert ............... | G06F 21/34 |
| 9,246,881 | B2 * | 1/2016 | Prot ...................... | G06F 21/606 |
| 9,280,765 | B2 * | 3/2016 | Hammad ............... | G06Q 20/12 |
| 9,304,743 | B1 * | 4/2016 | Breslau ..................... | G06F 8/51 |

(Continued)

*Primary Examiner* — Andrew Joseph Rudy
(74) *Attorney, Agent, or Firm* — Bookoff McAndrews, PLLC

(57) ABSTRACT

Embodiments include methods and systems for enabling third-party data service interoperability, comprising receiving, from an electronic data server, a request for a low-value token, the low-value token being associated with a subset of sensitive data associated with a user; providing the low-value token to the electronic data server; receiving a request for the subset of sensitive data, from a third-party data service server, the request comprising the low-value token; de-tokenizing the low-value token to obtain the subset of sensitive data; providing the subset of sensitive data to the third-party data service server; receiving, from an electronic data server, the low-value token and a transaction authorization request; determining, based on the low-value token and authorization request, an authorization response; and providing the authorization response to the electronic data server.

18 Claims, 6 Drawing Sheets

(56) References Cited

U.S. PATENT DOCUMENTS

| | | | |
|---|---|---|---|
| 9,306,939 B2* | 4/2016 | Chan | H04L 63/083 |
| 9,311,299 B1* | 4/2016 | Petrov | G06F 17/28 |
| 9,336,519 B2* | 5/2016 | Young | G06Q 20/045 |
| 9,349,063 B2* | 5/2016 | Smith | G06K 9/2063 |
| 9,460,440 B2* | 10/2016 | Antao | G06Q 10/10 |
| 9,516,059 B1* | 12/2016 | Dotan | H04L 63/1483 |
| 9,684,543 B1* | 6/2017 | Bequet | H04L 67/10 |
| 9,780,953 B2* | 10/2017 | Gaddam | H04L 9/3263 |
| 9,819,664 B2* | 11/2017 | Huang | G06F 21/54 |
| 9,838,387 B2* | 12/2017 | Zaheer | H04L 63/0846 |
| 9,846,878 B2* | 12/2017 | Kunnnick | G06Q 20/3674 |
| 9,848,052 B2* | 12/2017 | Kumnick | H04L 67/02 |
| 9,882,790 B2* | 1/2018 | Ollikainen | H04L 43/00 |
| 9,984,371 B2* | 5/2018 | Chitragar | G06Q 20/4016 |
| 10,026,087 B2* | 7/2018 | Salmon | G06Q 20/4016 |
| 10,038,563 B2* | 7/2018 | Gaddam | H04L 9/3263 |
| 10,108,946 B2* | 10/2018 | Perkins | G06Q 20/204 |
| 10,134,031 B2* | 11/2018 | Laracey | G06Q 20/3674 |
| 10,154,306 B2* | 12/2018 | Dua | H04N 21/4415 |
| 2007/0150942 A1* | 6/2007 | Cartmell | G06F 21/34 726/5 |
| 2008/0256617 A1* | 10/2008 | Cartwell | G06F 21/34 726/9 |
| 2017/0124558 A1* | 5/2017 | Molnar | G06Q 20/3829 |

* cited by examiner

US 10,404,703 B1

SYSTEMS AND METHODS FOR THIRD-PARTY INTEROPERABILITY IN SECURE NETWORK TRANSACTIONS USING TOKENIZED DATA

FIELD OF DISCLOSURE

The present disclosure relates generally to the field of secure network transactions and, more particularly, to managing secure network transfers of sensitive data between third parties using tokens.

BACKGROUND

One reality of the modern Internet-connected world is that the storage and transfer of sensitive and secure electronic data is potentially vulnerable to data breaches. Further, as electronic systems, such as point of sales ("POS") systems, become more complex, and as hackers become more sophisticated, security concerns are continually increasing.

In the early days of electronic transactions, dedicated magnetic card readers would scan unencrypted sensitive data on a credit card and transfer it to a transaction service for completion of the transaction. These communications were typically made over a dial-up connection and required basic encryption in the reader device in order to maintain security of the packet.

Over time, the reader devices have become more advanced, often with Internet connections and data input ports that enable malware to infect POS terminals. Further, as more and more merchants have moved to transfer data over the Internet, additional security features have been developed.

Most notably, "tokenization" is a means for replacing sensitive data with a "token" of data that may be non-decryptable or non-detokenizable by the merchant or other tokenization users (e.g. because they require third party decryption). Merchants, for example, might not ever store sensitive data themselves, thus enhancing data security.

However, a problem arises when merchants or other parties wish to involve third-party services that require access to sensitive data. For example, a merchant may wish to enable third-party fraud protections requiring access to account numbers of their customers not stored in merchant systems. A solution is needed that will preserve risk reduction, enable a cost-effective architecture, and that does not dilute the original value proposition.

SUMMARY

Included are embodiments for tokenizing sensitive data. Some embodiments of a method may comprise receiving, from an electronic data server, a request for a low-value token, the low-value token being associated with a subset of sensitive data associated with a user; providing the low-value token to the electronic data server; receiving a request for the subset of sensitive data, from a third-party data service server, the request comprising the low-value token; de-tokenizing the low-value token to obtain the subset of sensitive data; providing the subset of sensitive data to the third-party data service server; receiving, from an electronic data server, the low-value token and a transaction authorization request; determining, based on the low-value token and authorization request, an authorization response; and providing the authorization response to the electronic data server.

Also included are embodiments of a system. Some embodiments of the system include a data storage device storing instructions for enabling third-party data service interoperability, and a processor configured to execute the instructions to perform a method comprising receiving, from an electronic data server, a request for a low-value token, the low-value token being associated with a subset of sensitive data associated with a user; providing the low-value token to the electronic data server; receiving a request for the subset of sensitive data, from a third-party data service server, the request comprising the low-value token; de-tokenizing the low-value token to obtain the subset of sensitive data; and providing the subset of sensitive data to the third-party data service server.

Also included are embodiments of a computer-readable medium. Some embodiments of the computer-readable medium include a non-transitory computer-readable medium storing instructions that, when executed by a transaction processor, cause the transaction processor to perform a method for enabling third-party data service interoperability, the method comprising receiving, from an electronic data server, a request for a low-value token, the low-value token being associated with a subset of sensitive data associated with a user; providing the low-value token to the electronic data server; receiving a request for the subset of sensitive data, from a third-party data service server, the request comprising the low-value token; de-tokenizing the low-value token to obtain the subset of sensitive data; providing the subset of sensitive data to the third-party data service server.

Other embodiments and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

The accompanying drawings, which are incorporated in and constitute a part of this specification, illustrate several embodiments and together with the description, serve to explain the principles of the disclosure.

DESCRIPTION OF THE EMBODIMENTS

The present disclosed embodiments will now be described in detail with reference to several examples thereof as illustrated in the accompanying drawings. In the following description, numerous specific details are set forth in order to provide a thorough understanding of embodiments of the present disclosure. It will be apparent, however, to one skilled in the art, that embodiments may be practiced without some or all of these specific details. In other instances, well known process steps and/or structures have not been described in detail in order to not unnecessarily obscure the present embodiments. The features and advantages of embodiments may be better understood with reference to the drawings and discussions that follow.

The following discussion relates to methods and systems for low-value tokenization of sensitive data. Such systems and methods maintain increased security for electronic transactions while still enabling merchants and other transacting parties to engage third party services.

It should be appreciated that particular consideration is made herein to credit card transactions due to the prevalence of these transactions. Despite this reference to credit cards, the disclosed systems and methods apply equally well to the transfer of any sensitive data, whether "card present" or "card not present" (CNP). Disclosed systems and methods may apply, for example, in online transactions where a user is not physically present at a merchant location. Transactions may include debit transactions, gift card transactions, PayPal transactions, BitCoin transactions, smart card transactions, mobile application transactions, and the usage of loyalty cards, to name a few. Effectively, any circumstance where sensitive data, such as a personal account number (PAN), social security number, etc., or token corresponding thereto, is being transmitted over a network, systems and methods disclosed herein may be employed. Further, while the party seeking to initiate a secure transaction and/or provide a third-party service may be referred to herein as a "merchant" a party seeking to initiate a secure transaction need not be a merchant, but may be a service provider, or any party seeking to execute a transaction.

Figure 1:
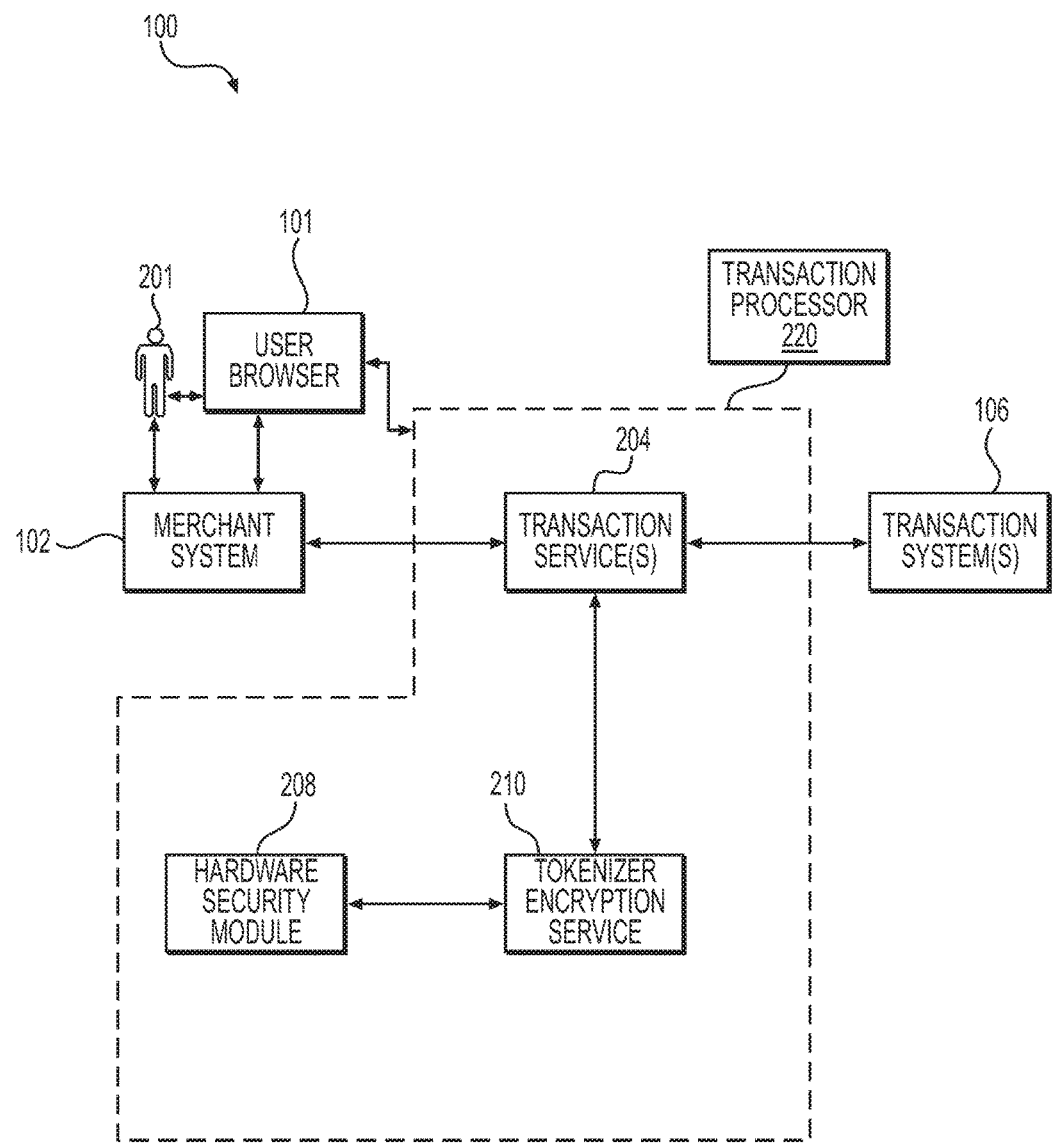
FIG. 1 is an example schematic block diagram of a system for tokenization, according to techniques presented herein.

FIG. 1 depicts a system 100 with a merchant system 102, such as a merchant point of sale ("POS") system(s), terminal(s), and/or server, that may collect credit card information (or other sensitive data) and transfer the data securely to the transaction system(s) 106, which may be a payment system(s), via an intermediary such as a transaction processor 220. The user 201 may provide sensitive data directly, such as at a POS terminal at a retail location, or via, for example, remotely via a user browser 101. The user browser 101 may interact with the merchant system 102, and/or directly with the transaction processor 220. The user browser 101 may be a client-side browser on a user computing device, but may also be a client-side app, or any other type of client-side data processor. The merchant system 102 may be a payment terminal (e.g., a "pin pad"), or, a data server, for example, displaying a merchant's e-commerce store. A transaction processor 220, such as a payment processor, may be an intermediary in this system to ensure validity of the request, and may generate a token. The token may be, for example, a randomly generated number. The token, which may also be referred to as a "high-value token" herein, may also be a pseudorandom number, encrypted information, or other character sequence. The transaction system(s) 106 may securely return a transaction response to merchant system 102, along with the token generated by the transaction processor and/or transaction system 106.

The token may be unique per customer/person or account number per merchant or organization. Thus, if a given user makes a purchase at merchant A, token A may be generated, but if a given user makes a purchase at merchant B, even if using the same credit card, token B may be generated.

By relying upon a token, a merchant system 102 is no longer required to send credit card information or other sensitive data for subsequent transactions, and may instead use the token, such as for follow-up activities. For example, a restaurant may initially run a transaction for the cost of a meal, and perform a follow-up transaction using the token for processing the tip. Alternatively, in a card-not-present context, an online merchant may run multiple transactions for a recurring web subscription using one or more tokens. Another example may include recurring transactions for a gym membership. A merchant may use tokens for returns or price adjustments rather than resending sensitive transaction information over a network. Using tokenization, a merchant or merchant may enhance security by not storing sensitive data of customers on its own systems. However, as will be discussed further below, this may create problems, as merchants may require sensitive data to perform their services.

As an example, a user 201, such as a customer or purchaser, may interact with merchant system 102 and/or user browser 101 to initiate a transaction, such as to pay for a good or service. In a physical environment, the user 201 may provide a magnetically stored account number and/or expiration number in the form of a credit card, but any form of sensitive data may be used, in some embodiments. In the e-commerce environment, the user 201 may type the credit card account number and expiration date into the user's computing device, for example in the user browser 101.

The merchant system 102 may include a fixed card reader, an integrated cash register system, a mobile payment application, a consumer's computer, or the like. As noted above, merchant system 102 may encrypt the collected data at the reader head or processor in order to ensure security. Alternatively, the initial encryption may be performed in software in the merchant system 102, in some embodiments. Encryption may also occur at the user browser 101. Software encryption, however, may increase vulnerability to security breach if merchant system 102 has been compromised. Regardless of location of initial encryption, an encryption protocol may be employed, in some embodiments. This encryption protocol may include a merchant ID, an amount for the transaction, a password(s) and/or an encrypted portion(s), or other transaction metadata. In some embodiments, the encrypted portion may be in the following format:

<encryption>
<block>
<key>
<serial number>
</encryption>

It should be appreciated that, while a specific encryption protocol is presented here, alternate known encryption schemas may be readily employed in alternate embodiments.

In one embodiment, the merchant system 102 and/or user browser 101 may provide the collected account information (and/or other sensitive data) to a transaction service(s) 204, such as payment service(s), in the tokenization and transaction processor 220 (e.g., payment management system or payment processor). This transfer of data may be performed over a telecommunications network, for example, the Internet, or via any other type of network. Transaction service(s) 204 may include a plurality of systems for receiving the data, dependent upon transmission mechanism and data type, as will be discussed in greater detail below. The transaction service(s) 204 may perform an initial check for encryption of the data. If the received data is not encrypted, the received data may be transferred promptly to transaction system(s) 106 for transfer of funds, or directly to entities such as Visa, MasterCard, etc. Transaction system(s) 106 may be operated by entities such as Global Card Bank, for example. However, where encryption is present, and/or tokenization is desired, transaction service(s) 204 may transfer the information to a tokenizer encryption service 210 for processing. Transaction service(s) 204 may validate the encrypted block, encrypted key, and/or reader serial number lengths. It may also validate the merchant's ID with a stored database of terminal IDs.

Tokenizer encryption service 210 may further validate credentials and identify keys for the encrypted data. The data may further be submitted to a hardware security module 208 for decryption and for the generation of a token. The token may include a PAN, an expiration date for the token, and/or an expiration date for the card. Tokens might also not themselves contain any sensitive data, but rather merely correspond to sensitive identification data such as social security numbers, account information, or other sensitive financial data, such as cardholder data. The sensitive data may be stored securely at the transaction processor 220 or elsewhere.

In some embodiments, any expiration date of the token, if present, may be varied depending upon whether the token is designated as a single use token or as a token for recurring transactions (i.e., a subscription). For example, a one-year and two-year expiration may be provided for single use and recurring tokens, respectively, which allows for a longer validity period where the merchant is anticipating reuse of the token, and ensures that single use tokens are not stored longer than necessary.

The token, which may be encrypted, and clear text of the data supplied by merchant system 102, may be returned to tokenizer encryption service 210 and subsequently to transaction service(s) 204. Transaction service(s) 204 may transfer the clear text to transaction system(s) 106 for a transaction response. The response may then be provided, along with the token, back to the merchant, such as to the merchant system 102. The merchant may then store the encrypted token for later transactions.

Thus, the merchant may be prevented from accessing sensitive data without keys which may be maintained within hardware security module 208, or elsewhere in a secured location accessible to the transaction processor 220. Thus, for account information to be compromised, both the merchant system 102 (or other merchant storage) and the transaction processor 220 would need to be breached. Alternatively, sensitive data may be stored exclusively within the transaction processor 220.

Figure 2:
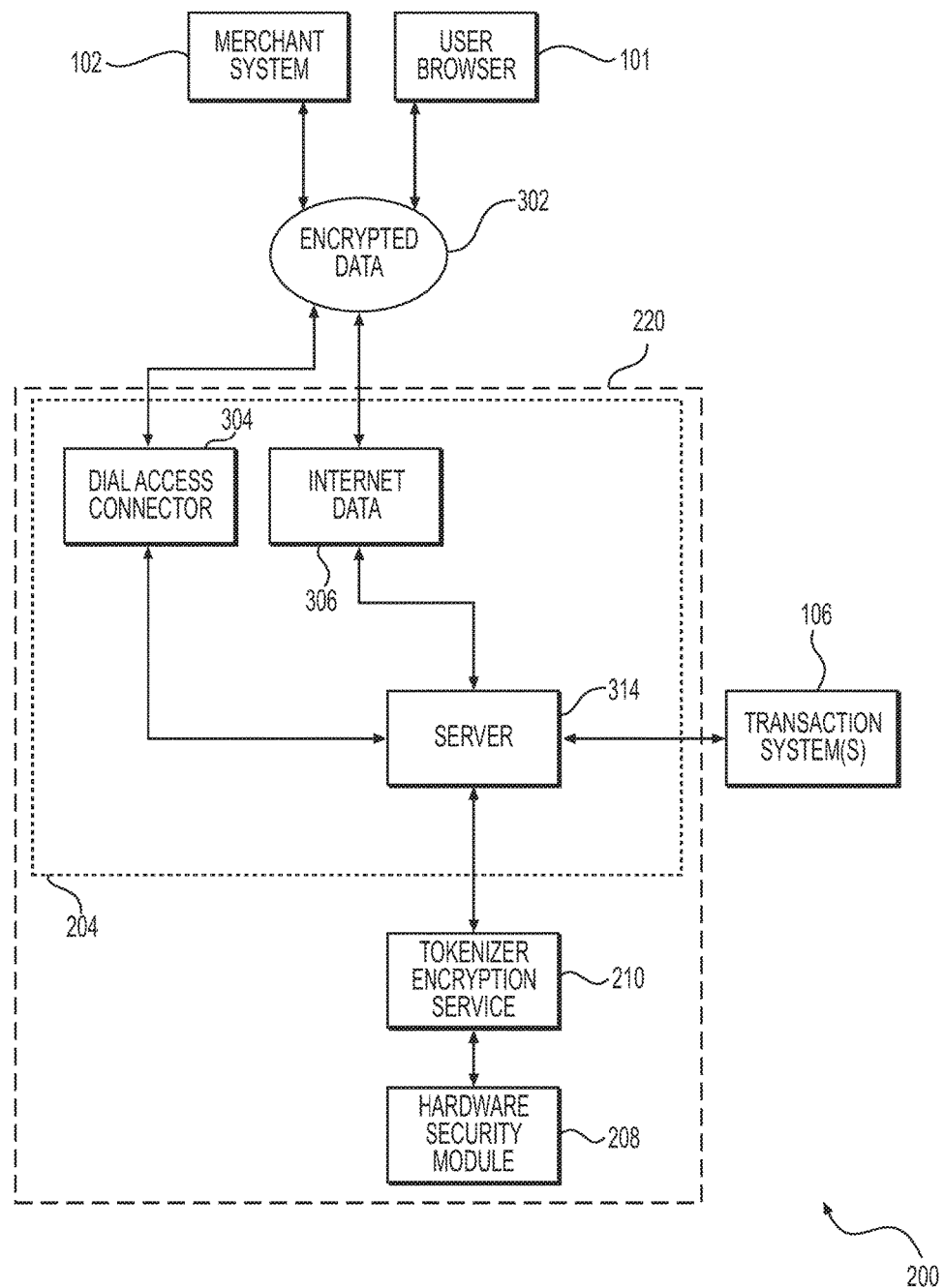
FIG. 2 is an example schematic block diagram for a more detailed view of components within the tokenization system and transaction processor, in accordance with some embodiments.

FIG. 2 is an example schematic block diagram for a more detailed view of components within the tokenization system and transaction processor 220, in accordance with some embodiments. In this example block diagram, unencrypted data or encrypted data 302 from the merchant system 102 and/or user browser 101 may be delivered to the transaction processor 220, such as to transaction service(s) 204, via, for example, a dial-up access connector 304, or Internet data connection 306, through which data may pass, for example, via network socket and/or web service. Although a dial-up access connector 304 and Internet data 306 connections are shown, any type of data connection may be established for data transfer purposes. Incoming data may be provided to server 314.

In addition to the server 314, other servers may be included, in alternate embodiments, in order to handle any data inputs. For example, in embodiments where gift cards or loyalty cards are being processed, the system may include a gift card server or loyalty card server. The system may be scalable to take any number of payment types, as is desirable for any particular scenario.

The server 314 may determine whether a token is present and/or if data is encrypted. If the data is not encrypted and the merchant is not set up for tokenization, the clear text data may be transferred to the transaction system(s) 106 (such as Global Card Bank, Visa, etc.) for approval or declining. Otherwise, if the data includes a token or encrypted data, or if tokenization is otherwise requested, the data may be provided to tokenizer encryption service 210, as previously discussed.

Figure 3:
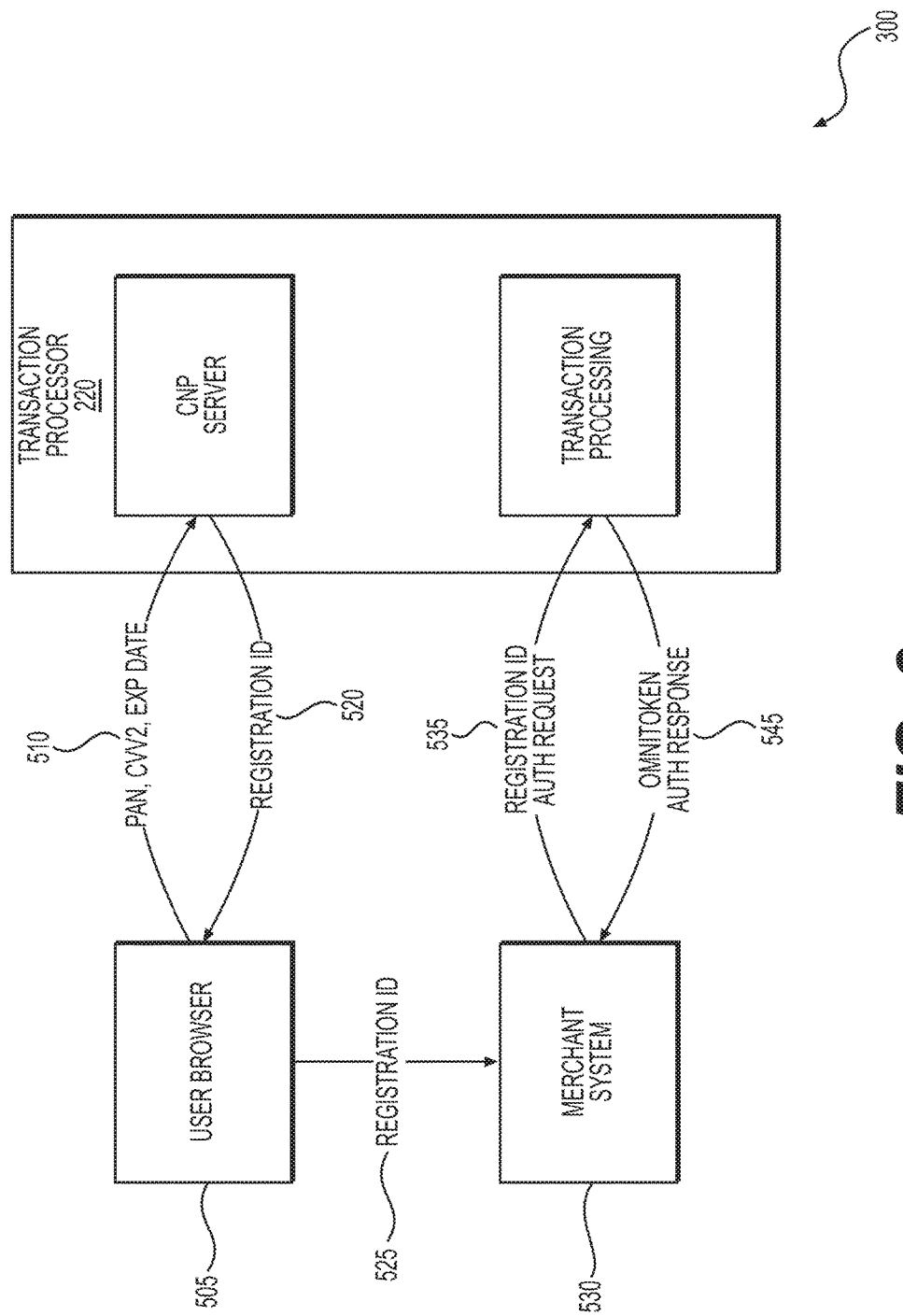
FIG. 3 is an example schematic block diagram of a tokenizer service, according to techniques presented herein.

FIG. 3 is a block diagram illustrating a method of performing an online transaction utilizing tokens where a user may initiate a card-not-present (CNP) transaction using, for example, a browser 101. Security risks for both the customer and the merchant may be particularly high in a CNP scenario. If merchants were to store sensitive data of customers, for example, they would be exposing themselves to legal liability in the event of a security breach. One solution to this problem is to prevent the merchant from ever obtaining the sensitive data at all. However, as will be discussed below, the merchant may still need some forms of sensitive data for certain purposes.

In a CNP transaction, at step 505 a user 201 may enter, into a browser 102, sensitive data such as, but not limited to, a personal account number (PAN), a card verification value (CVV), and/or an expiration date of the card, for example in order to execute an online purchase. This information may be entered in a web form that appears to the user to be owned by the merchant, but the form may actually be hosted by transaction processor 220 via, for example, an iFrame.

At step 510, the sensitive data may be transferred to the transaction processor 220, such as a payment processor. A server such as a CNP Server, which may be server 314 or transaction services 204, may receive the sensitive data, which may be encrypted, and provide a registration identifier 520 back to the user browser 101. The registration identifier 520 may be a randomly generated, non-sensitive, low-value token that acts as a replacement for the PAN and/or other sensitive data.

At step 525, the registration identifier 520 may be provided to the merchant system 101, such as an e-commerce server. The merchant's system may provide the registration identifier 520 to a transaction processing unit, which may be, for example, server 314 or transaction services 204. The transaction processor 220 may convert the registration identifier 520 to a high-value token or "omnitoken authorization response" 545, which may be provided to the merchant's server 101. The high-value token 545 may be reused by the merchant for subsequent transactions, as discussed above. While transaction processing and at least one CNP server are depicted as sending and receiving data, any entity in the transaction processor may perform the steps depicted in FIG. 3, including server 314 or transaction services 204.

Using systems and methods such as those of FIG. 3, sensitive data such as cardholder data might not ever be transmitted to the merchant's servers, because the webpage displayed in the user browser at step 505, or a portion thereof, may be hosted by the transaction processor 220.

While preventing the merchant from having access to sensitive data may enhance security, it may present a business challenge to the merchant, who may wish to enable or maintain business operations through third-parties who need sensitive data, such as cardholder data to perform their desired business functions. For example, merchants may wish to obtain services of non-financial value-added service agencies like third-party risk and/or fraud scoring services (for example, CyberSource or Cardinal Commerce), who may require the PAN.

One solution would be for the merchant to be able to provide the high-value token to the transaction processor 220, and be provided with sensitive data, such as the PAN, in return. However, this would allow merchants to create a mapping between PANs and high-value tokens, which is a security risk. Another solution would be to allow the merchants to provide the high-value tokens to the third-party service provider. The third-party service provider could then provide the high-value token to the transaction processor 220, and be provided with the sensitive data. However, this would allow the third-party service to potentially create a mapping between PANs, for example, and tokens, which is again a security risk. Mappings of high-value tokens to sensitive data may allow the replication of the transaction processor's 220 mapping token vault outside of a secure environment. With a mapping table, third parties could improperly use PAN/token mappings and cache tokens so they would not have to call the transaction processor 220 on every transaction. In addition, there would be no validation of who is performing the de-tokenization service. Thus, a solution is needed that will build value, preserve risk reduction, enable a cost-effective architecture, and that does not dilute the original value proposition.

Figure 4:
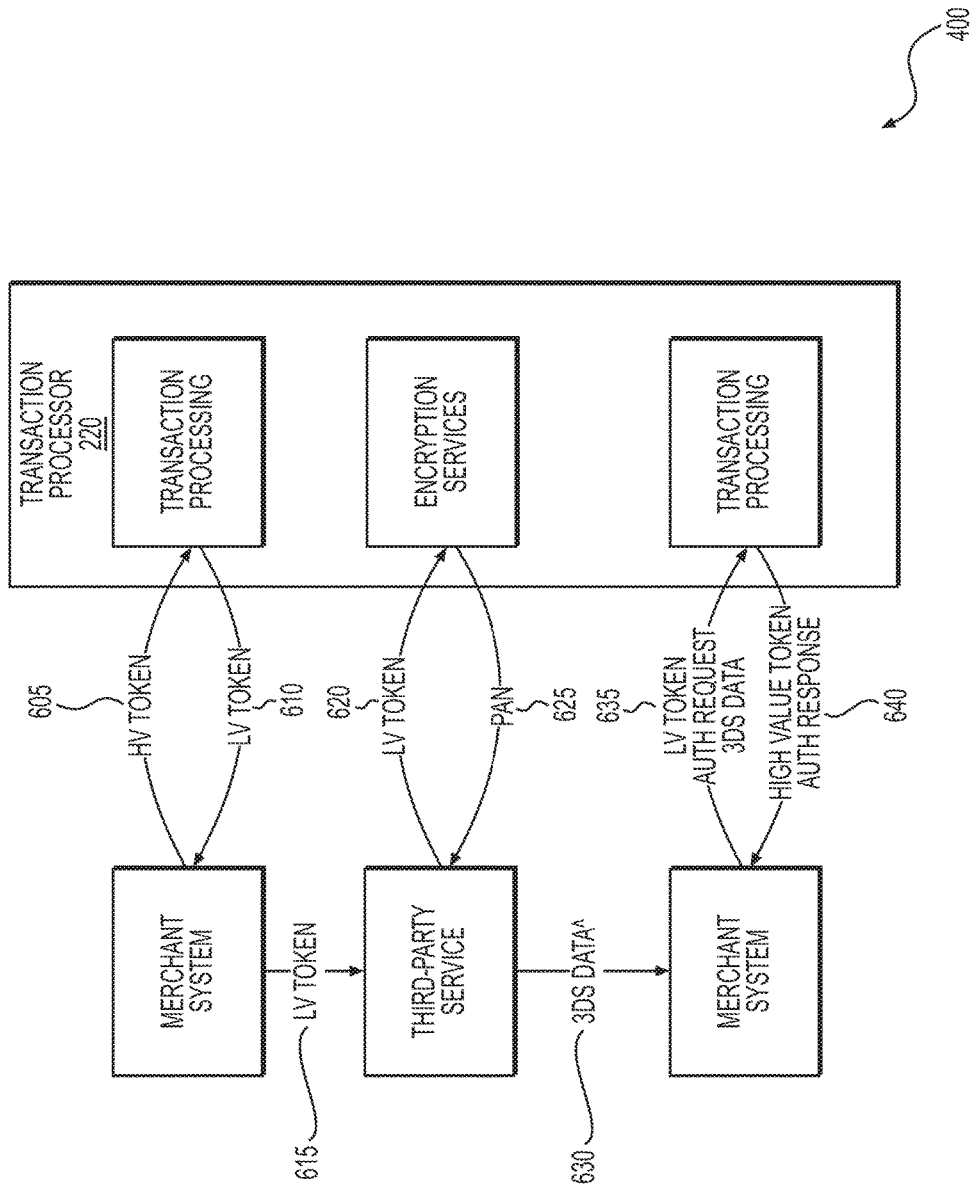
FIG. 4 is a block diagram illustrating a method of performing a transaction using a low-value token, according to techniques presented herein.

FIG. 4 is a block diagram illustrating a method to provide a low-value token to a merchant system 102 so that the merchant system can enable third-party services to obtain sensitive data, according to certain embodiments presented herein.

A low-value token may be generated dynamically, and may have a unique value for each transaction, even if the same PAN is presented for tokenization multiple times. Low-value tokens may utilize additional compensating controls such that the token applies only to specific transactions and processing environments. A transaction-based token value requested through a low-trust environment over the Internet. The token value might only be valid for 24-hours, or some other pre-determined period of time, after which it can no longer be used for payment processing.

Other compensating controls may be utilized. For example, third parties may be authenticated in order to be able to detokenize with the transaction processor 220. An authentication of merchant high-value token to low-value token may be performed via an existing message interface specification. The third-party may be validated as a trusted requestor to call the transaction processor 220 to detokenize for every transaction.

Token group controls may also be utilized, for example in order to ensure that the detokenization is being performed for the right merchant. A token group may be identified by a merchant. As third-parties may support multiple merchants, controls may be taken to ensure that a third-party doesn't detokenize a low-value token under the wrong merchant token group. For example, the third-party may provide an additional merchant identifier to ensure the associated merchant is correct.

Transaction controls may also be utilized, for example in order to restrict the types of transactions third parties can perform. Third parties may only be able to perform detokenization operations with a low-value token and not be able to detokenize with a high-value token (omnitoken), or retokenize, etc. Third parties may be able to perform tokenization of the PAN to a low-value token to provide to the retailer. Operations may also be able to be performed in several ways. Operations may be able to be performed directly to the transaction processor 220 platform using a message specification. A non-financial interface may also be used for batch processing.

Turning back to FIG. 4, if a merchant wishes to engage a third-party service, and has a stored a high-value token for a given customer or user, the merchant system 101 may provide the high-value token to the transaction processor 220 at step 605 in a request for a low-value token. The high-value token may be encrypted, and the request for a low-value token may be encrypted. The transaction processor 220 may be prompted by the request to provide a low-value token back to the merchant at step 610. A request may further specify the sensitive data to which the low-value token will correspond. For example, the low-value token may be associated with the PAN corresponding to the high-value token. Alternatively, the transaction processor 220 may provide the low-value token directly to the third-party service. The low-value token may be a token that is not enabled or capable of performing transactions, but rather is created by the transaction processor 220 for the limited purpose of being able to obtain one or more pieces of sensitive data, such as the PAN, for a given user or customer. The low-value token may be able to obtain only a subset of available sensitive data associated with a given user/client/account.

At step 615, the merchant may provide the low-value token to the third-party service. At step 620, the third-party service may provide the low-value token to the transaction processor 220, for example to an encryption service, which may be the tokenizer encryption service 210. The third party may be validated in order to be able to perform detokenization, as discussed above. The low-value token may be provided using a web service call. At step 625, the sensitive data associated with the low-value token, such as the PAN, may be provided to the third-party service. A de-tokenization procedure may be performed by the transaction processor 220 to determine the sensitive data. The third-party may be an unaffiliated entity separate from the merchant and may be prohibited from providing sensitive data, such as the PAN, to the merchant, or any party in possession of the associated high-value token. The third-party service may also reach out to a payment network, for example for a 3DS transaction, may perform a fraud check, and/or any number of financial or non-financial operations. Based on the PAN or other sensitive data provided, at step 630 the third-party may provide data related to the performance of the third-party service, such as 3-D Secure response data, to the merchant. While 3-D Secure response data is discussed herein, techniques presented herein may use any third-party security services, such as data security services and/or fraud detection services. At step 635, the merchant may request authorization of the transaction using the low-value token by providing the low-value token, a request to authorize the transaction, and/or third-party service data, for example 3-D Secure data, to the transaction processor 220. The transaction processor 220 may determine whether to authorize the transaction based on the low-value token, the authorization request, and/or the third-party service data. Alternatively, based on the results of the third-party service, the merchant may not request transaction authorization at all. At step 640, the transaction processor 220 may respond with the high-value token and/or the authorization response. While transaction processing and encryption services are depicted as sending and receiving data, any entity in the transaction processor may perform the steps depicted in FIG. 4, including server 314 or transaction services 204.

Steps 630, 635, and 640 may be performed in a variety of different ways, and the manner of performance may depend on which party is seeking the authorization, and the authorization requirements of the particular transaction. Steps 630, 635, and 640 illustrate an example situation where 3-D Secure may be used.

As an example, at step 635, the third-party service may alternatively send the authorization request to the transaction processor 220 directly. Only a low value token and/or an authorization request might be sent in this scenario.

Additional items might also be provided. For example, the third-party service might obtain a fraud check using the PAN. At step 635, the fraud check score may be provided to the transaction processor along with the low-value token and authorization request.

At step 640, the high-value token might or might not be passed back with the authorization response.

Figure 5:
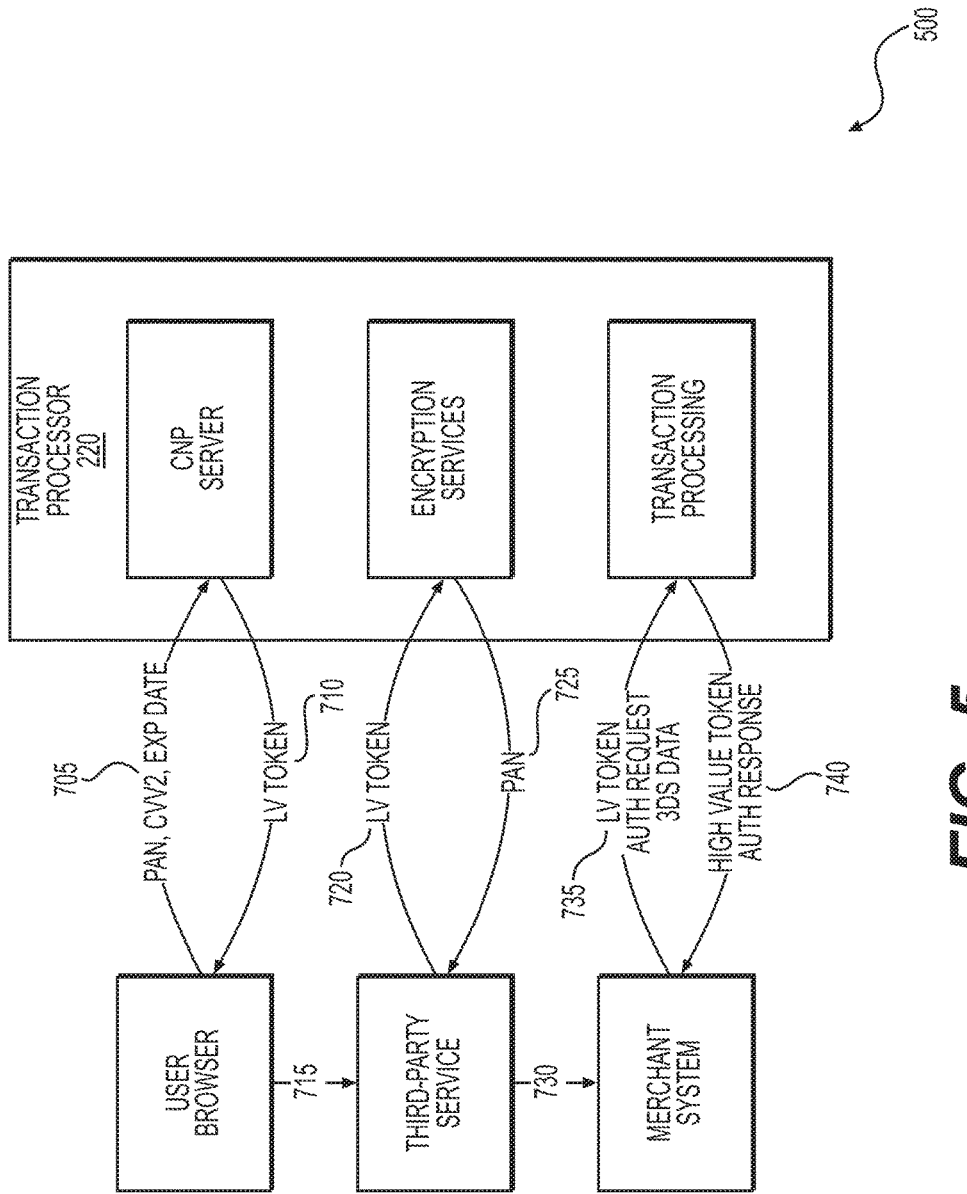
FIG. 5 is a block diagram illustrating a method of performing a transaction using a low-value token, according to techniques presented herein.

Thus, FIG. 4 demonstrates a method of implementing a transaction using a third-party service when sensitive data has already been collected from a user, and a corresponding high-value token is already in storage. FIG. 5 demonstrates a similar method, but further illustrates initial capture of sensitive data, such as cardholder data, for example from a new user or customer. At step 705, sensitive data, such as cardholder data, may be obtained from the customer or user, such as in a terminal or browser 102. The sensitive data may be provided to the transaction processor 220, such as to a card-not-present server 515.

The transaction processor 220 may provide a low-value token to the merchant, terminal, and/or browser at step 710. Alternatively, the transaction processor 220 may provide the low-value token directly to the third-party service. The low-value token may be a token that is not enabled to perform transactions, but rather is created by the transaction processor 220 for the limited purpose of being able to obtain one or more pieces of sensitive data for a given user or customer, such as the PAN.

At step 715, the merchant may provide the low-value token to the third-party service. At step 720, the third-party service may provide the low-value token to the transaction processor 220, for example to an encryption service, which may be the tokenizer encryption service 210. The third party may be validated, for example by the transaction processor 220, in order to be able to be trusted and perform detokenization, as discussed above. The low-value token may be provided using a web service call. At step 725, the sensitive data associated with the low-value token, such as the PAN, may be provided to the third-party service. The third-party may be prohibited from providing sensitive data, such as the PAN, to the merchant, or any party in possession of the associated high-value token. The third-party service may also reach out to a payment network, for example for a 3DS transaction, may perform a fraud check, and/or any number of financial or non-financial operations. Based on the PAN or other sensitive data provided, at step 730 the third-party may provide data related to the performance of the third-party service, such as 3-D Secure response data, to the merchant server 101. At step 735, the merchant may request authorization of the transaction using the low-value token, by providing the low-value token, a request to authorize the transaction, and/or third-party service data, for example 3-D Secure data, to the transaction processor 220. Alternatively, based on the results of the third-party service, the merchant may not request transaction authorization at all. At step 740, the transaction processor 220 may respond with the high-value token and/or the authorization response. While transaction processing, encryption services, and at least one CNP server are depicted as sending and receiving data, any entity in the transaction processor may perform the steps depicted in FIG. 5, including server 314 or transaction services 204.

Steps 730, 735, and 740 may be performed in a variety of different ways, and the manner of performance may depend on which party is seeking the authorization, and the authorization requirements of the particular transaction. Steps 730, 735, and 740 illustrate an example situation where 3-D Secure may be used.

As an example, at step 735, the third-party service may alternatively send the authorization request to the transaction processor 220 directly. Only a low value token and/or an authorization request might be sent in this scenario.

Additional items might also be provided. For example, the third-party service might obtain a fraud check using the PAN. At step 735, the fraud check score may be provided to the transaction processor along with the low-value token and authorization request.

At step 740, the high-value token might or might not be passed back with the authorization response.

Figure 6:
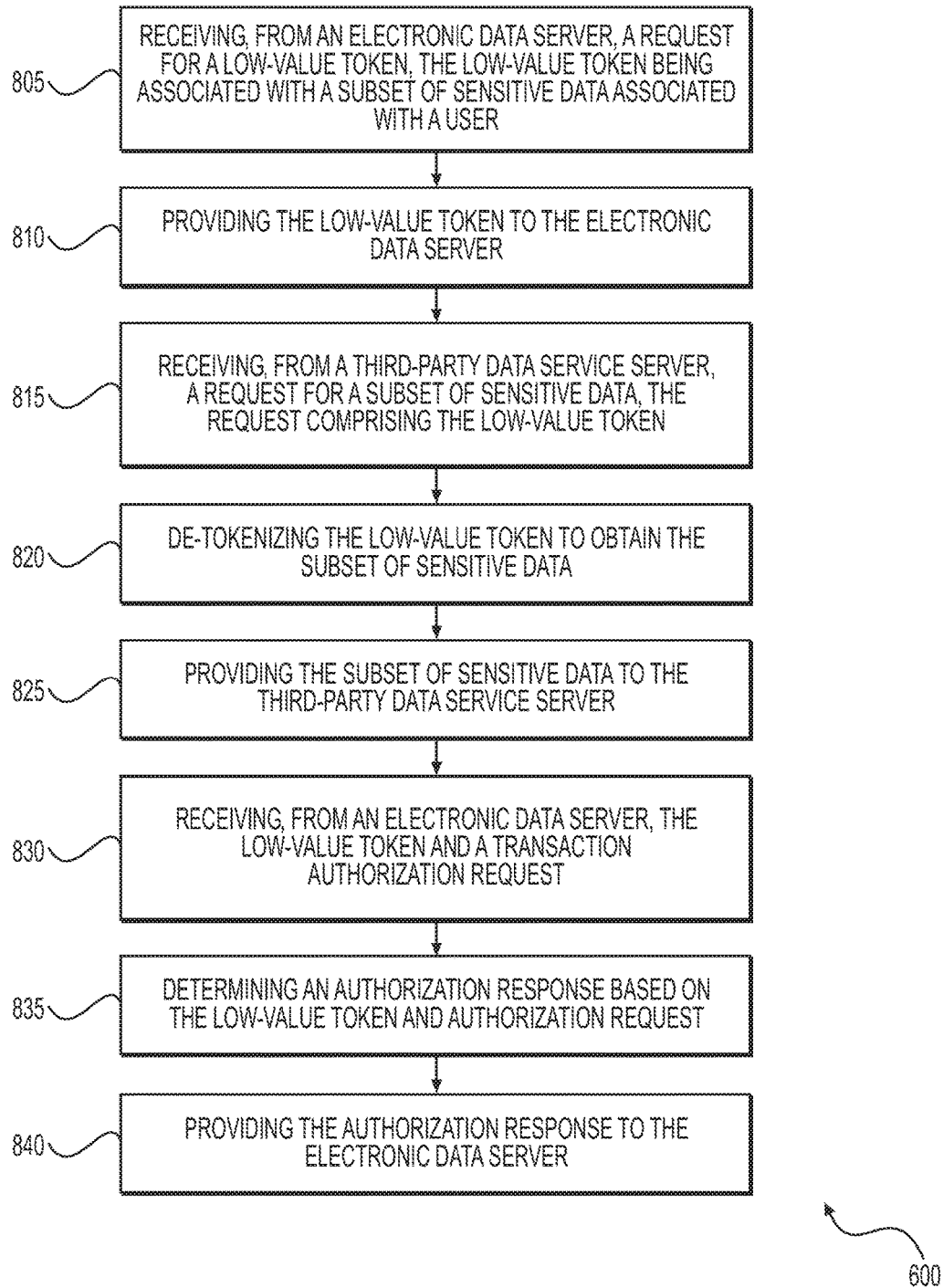
FIG. 6 is a block diagram illustrating a method of performing a transaction using a low-value token, according to techniques presented herein.

FIG. 6 is a flow diagram illustrating a method of performing a transaction using a low-value token, according to techniques presented herein. At step 805, a request may be received, from an electronic data server, for a low-value token, the low-value token being associated with a subset of sensitive data associated with a user. At step 810, the low-value token may be provided to the electronic data server. At step 815, a request may be received for the subset of sensitive data from a third-party data service server, the request comprising the low-value token. At step 820, the low-value token may be de-tokenized to obtain the subset of sensitive data. At step 825, the subset of sensitive data may be provided to the third-party data service server. At step 830 the low-value token and a transaction authorization request may be received, from an electronic data server. At step 835, an authorization response may be determined, based on the low-value token and authorization request. At step 840, the authorization response may be provided to the electronic data server.

Techniques presented herein improve the technical field by, for example, enabling a merchant to comply with the Payment Card Industry Data Security Standard (PCI DSS) in a manner that builds value, preserves risk reduction, enables a cost-effective architecture, and that does not dilute the original value proposition. This allows third-parties to receive a limited use token that can only be used for a limited, need-to-know function, while reducing risk to the transaction processor of third-parties having access to both sensitive data and high-value tokens. A further advantage is that merchants with an existing relationship with third-party data security operators may retain those relationships, yet still obtain the benefits of obtaining a transaction processor. The field of tokenization and network security is improved, as, for example, merchants may be able to engage third-party services to enhance security while not actually ever obtaining or storing the sensitive data of their customers, thus limiting the potential damage of a security breach. Further, techniques presented herein solve a problem arising in the post-Internet era, namely, for example, an electronic merchant needing to obtain third-party data security services requiring sensitive electronic data, while the merchants themselves remain only in possession of data tokens rather than the sensitive electronic data itself.

In addition to a standard desktop, or server, it is fully within the scope of this disclosure that any computer system capable of the required storage and processing demands would be suitable for practicing the embodiments of the present disclosure. This may include tablet devices, smart phones, pin pad devices, and any other computer devices, whether mobile or even distributed on a network (i.e., cloud based).

In addition, embodiments of the present disclosure further relate to computer storage products with a computer-readable medium that have computer code thereon for performing various computer-implemented operations. The media and computer code may be those specially designed and constructed for the purposes of the present disclosure, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

While the present disclosure has been described in terms of several embodiments, there are alterations, modifications, permutations, and substitute equivalents, that fall within the scope of this disclosure.

It should also be noted that there are many alternative ways of implementing the methods and systems of the present disclosure. It is therefore intended that the following appended claims be interpreted as including all such alterations, modifications, permutations, and substitute equivalents as fall within the true spirit and scope of the present disclosure.

What is claimed is:

1. A method for enabling third-party data service interoperability, comprising:
   receiving, at a transaction processor server from an electronic data server, a request for a low-value token, the request comprising a high-value token, the high-value token being associated with a set of sensitive data associated with a user and being usable by the electronic data server to facilitate subsequent electronic transactions, and the low-value token being a limited-use token configured to obtain a subset of sensitive data associated with the user;
   retrieving, by the transaction processor server, the low-value token from a database;
   providing, by the transaction processor server, the low-value token to the electronic data server;
   receiving, at the transaction processor server from a third-party data service server, a request for the subset of sensitive data, the request comprising the low-value token, the low-value token having been provided to the third-party data service server by the electronic data server;
   de-tokenizing, by the transaction processor server, the low-value token to obtain the subset of sensitive data;
   providing, by the transaction processor server, the subset of sensitive data to the third-party data service server, the third-party data service server configured to perform a third-party security service based on the subset of sensitive data;
   receiving, at the transaction processor server from the electronic data server, the low-value token and a transaction authorization request once the third-party data service server completes the third-party security service;
   determining, by the transaction processor server, an authorization response based on the low-value token and authorization request; and
   providing, by the transaction processor server, the authorization response to the electronic data server.

2. The method of claim 1, wherein determining the authorization response further comprises:
   receiving, from the electronic data server, third-party data security service data; and
   determining the authorization response based on the low-value token, the authorization request, and the third-party security service data.

3. The method of claim 1, wherein sensitive data comprises social security data, account data, or credit card data of the user.

4. The method of claim 1, wherein the request for the low-value token specifies the subset of sensitive data with which the low-value token is associated.

5. The method of claim 1, wherein the third-party data service server is prohibited from forwarding the subset of sensitive data to the electronic data server.

6. The method of claim 1, wherein the electronic data server uses an Internet browser page with an embedded iFrame element to form the request for the low-value token.

7. A system for enabling third-party data service interoperability, the system comprising:
   a data storage device storing instructions for enabling third-party data service interoperability; and
   a processor configured to execute the instructions to perform a method comprising:
      receiving, from an electronic data server, a request for a low-value token, the request comprising a high-value token, the high-value token being associated with a set of sensitive data associated with a user and being usable by the electronic data server to facilitate subsequent electronic transactions, and the low-value token being a limited-use token configured to obtain a subset of sensitive data associated with the user;
      retrieving the low-value token from a database;
      providing the low-value token to the electronic data server;
      receiving a request for the subset of sensitive data, from a third-party data service server, the request comprising the low-value token, the low-value token having been provided to the third-party data service server by the electronic data server;
      de-tokenizing the low-value token to obtain the subset of sensitive data; and
      providing the subset of sensitive data to the third-party data service server, the third-party data service server configured to perform a third-party security service based on the subset of sensitive data.

8. The system of claim 7, further comprising:
   receiving, from the electronic data server, the low-value token and a transaction authorization request;
   determining, based on the low-value token and authorization request, an authorization response; and
   providing the authorization response to the electronic data server.

9. The system of claim 8, wherein the electronic data server uses an Internet browser page with an embedded iFrame element to form the request for the low-value token.

10. The system of claim 8, wherein determining the authorization response further comprises:
  receiving, from the electronic data server, third-party data security service data; and
  determining the authorization response based on the low-value token, the authorization request, and the third-party security service data.

11. The system of claim 8, wherein sensitive data comprises social security data, account data, or credit card data of the user.

12. The system of claim 8, wherein the request for the low-value token specifies the subset of sensitive data with which the low-value token is associated.

13. The system of claim 8, wherein the third-party data service server is prohibited from forwarding the subset of sensitive data to the electronic data server.

14. A non-transitory computer-readable medium storing instructions that, when executed by a transaction processor, cause the transaction processor to perform a method for enabling third-party data service interoperability, the method comprising:
  receiving, from an electronic data server, a request for a low-value token, the request comprising a high-value token, the high-value token being associated with a set of sensitive data associated with a user and being usable by the electronic data server to facilitate subsequent electronic transactions, and the low-value token being a limited-use token configured to obtain a subset of sensitive data associated with the user;
  retrieving the low-value token from a database;
  providing the low-value token to the electronic data server;
  receiving a request for the subset of sensitive data, from a third-party data service server, the request comprising the low-value token, the low-value token having been provided to the third-party data service server by the electronic data server;
  de-tokenizing the low-value token to obtain the subset of sensitive data;
  providing the subset of sensitive data to the third-party data service server, the third-party data service server configured to perform a third-party security service based on the subset of sensitive data.

15. The computer-readable medium of claim 14, further comprising:
  receiving, from the electronic data server, the low-value token and a transaction authorization request;
  determining, based on the low-value token and authorization request, an authorization response; and
  providing the authorization response to the electronic data server.

16. The computer-readable medium of claim 15, wherein the request for the low-value token specifies the subset of sensitive data with which the low-value token is associated.

17. The computer-readable medium of claim 15, wherein the third-party data service server is prohibited from forwarding the subset of sensitive data to the electronic data server.

18. The computer-readable medium of claim 15, wherein the method of determining the authorization response further comprises:
  receiving, from the electronic data server, third-party data security service data; and
  determining the authorization response based on the low-value token, the authorization request, and the third-party security service data.

\* \* \* \* \*